United States Patent [19]

Sabo

[11] Patent Number: 4,635,944
[45] Date of Patent: Jan. 13, 1987

[54] METHOD FOR PROVIDING A SEAL AROUND A SHAFT AND AGAINST A BEARING HOUSING

[76] Inventor: Robert C. Sabo, 291 Indian Paint Brush, #3, Casper, Wyo. 82604

[21] Appl. No.: 652,583

[22] Filed: Sep. 20, 1984

[51] Int. Cl.⁴ .......................... F16J 15/18; F16J 9/20; F16J 9/28
[52] U.S. Cl. ......................................... 277/1; 277/9; 277/165; 277/216; 277/228
[58] Field of Search ....................... 277/1, 9, 165, 216, 277/95, 237, 142, 177, 178, 203, 225, 228, 81 R, 92, 136, 186, 187, 188 R, 188 A, 220, 222, 227, 229

[56] References Cited

U.S. PATENT DOCUMENTS

| 239,111 | 3/1881 | O'Meara | 277/216 |
| 463,531 | 11/1891 | Missel et al. | 277/216 |
| 1,942,489 | 1/1934 | Pfefferle | 277/220 |
| 1,979,691 | 11/1934 | Jackson | 277/228 X |
| 2,459,395 | 1/1949 | Smith | 277/216 |
| 2,459,721 | 1/1949 | Poltorak | 277/229 X |
| 3,093,383 | 6/1963 | Lew | 277/92 |
| 3,124,502 | 3/1964 | Radke | 277/227 X |
| 3,135,128 | 6/1964 | Rudolph | 277/95 X |
| 3,300,225 | 1/1967 | Shepler | 277/187 X |
| 3,381,970 | 5/1968 | Brown | 277/188 R X |
| 3,389,921 | 6/1968 | Lojkutz | 277/92 X |
| 3,545,771 | 12/1970 | Downing et al. | 277/187 |
| 3,770,285 | 11/1973 | Grover | 277/165 |
| 3,837,657 | 9/1974 | Farnam et al. | 277/1 |
| 4,161,316 | 7/1979 | Nowack et al. | 277/9 |
| 4,421,328 | 12/1983 | Thurston et al. | 277/216 |

FOREIGN PATENT DOCUMENTS

| 578592 | 6/1959 | Canada | 277/222 |
| 647514 | 8/1962 | Canada | 277/9 |
| 1396938 | 3/1965 | France | 277/216 |
| 56-147965 | 11/1981 | Japan | 277/1 |
| 1072891 | 6/1967 | United Kingdom | 277/227 |
| 2131896 | 6/1984 | United Kingdom | 277/92 |

Primary Examiner—Robert S. Ward
Attorney, Agent, or Firm—Dean P. Edmundson

[57] ABSTRACT

A novel sealing technique for bearings from which a rotating shaft extends outwardly. The novel seal comprises an elongated flexible strip having two ends. The seal encircles the shaft and is adhered to the face of the bearing housing.

3 Claims, 5 Drawing Figures

METHOD FOR PROVIDING A SEAL AROUND A SHAFT AND AGAINST A BEARING HOUSING

FIELD OF THE INVENTION

This invention relates to novel split seals and techniques for sealing around shafts without the need for disassembly of equipment.

BACKGROUND OF THE INVENTION

Wherever rotating shafts are present in machinery and other such equipment it is necessary to support the shafts by means of a bearing in a housing. The bearings typically used are roller bearings or ball bearings, for example. With either type of bearing it is necessary to maintain sufficient lubricant therein to minimize wear of the bearing and the shaft and to prevent seizing of the shaft within the bearing. For this reason a seal is used at the outside edge of the bearing housing to prevent loss of lubricant.

Not uncommonly the seal in the bearing fails. This may be due to a number of reasons but the result is that the lubricant is permitted to escape from the bearing. Unless this problem is corrected in a timely manner the bearing may be ruined, the shaft may become scored, and the remainder of the machine or the equipment supported by the shaft may become damaged.

Conventionally the failed or inoperative seal is removed entirely and replaced with a new seal. However, this procedure requires disassembly of at least a portion of the machine or equipment. Of course, this necessarily involves a great amount of time and expense. When the equipment or machine is very large the repair procedure will also require the use of large and high capacity tools such as hoists, cranes, etc. in order to lift and move certain portions of the machine which must be disassembled before the seal may be removed.

For example, when the equipment which must be repaired is an oil well pumping unit, the shafts are several inches in diameter and the crank arms supported on such shafts are several feet long and weigh hundreds or thousands of pounds. Accordingly, in order to replace failed seals in such a unit the repair process is very time-consuming and is very costly. Furthermore, heavy equipment is required to handle the disassembled components. Moreover, the lost production time can result in a considerable loss until the repairs are completed and the unit is placed back in service. There are many other types of machinery and equipment in use in various types of industries which present similar problems when seals fail.

Although there has been suggested one type of split seal which may be installed around a shaft, use of such seal does not overcome all of the problems normally encountered nor is it suitable for all applications. Such seal is available from Garlock under the tradename "Split Klozure" and is U-shaped in cross-section. A plurality of metal fingers molded into the rubber seal body maintain the desired U-shape. After the seal has been fitted over the shaft a separate cover plate assembly must be made which is then bolted onto the bearing housing to firmly secure the seal in the desired position. This requires that sufficient space be available in front of the face of the bearing housing to enable the use of drills, etc. to form and then thread the requisite holes in the bearing housing. It is also necessary to make a suitable cover plate for each installation.

Of course, there is not always sufficient available space at the seal location to enable holes to be drilled and threaded, for example. Nor is there always sufficient space to accommodate the required cover plate. Moreover, the Garlock seal does not have the capability to accommodate shafts of many different sizes. Rather, only minor variations in shaft sizes can be accommodated by an individual seal.

The present invention provides a seal design and sealing techniques which overcome the disadvantages associated with conventional seals and with the Garlock seals.

SUMMARY OF THE PRESENT INVENTION

In accordance with the present invention there is provided an elongated strip having two terminal ends. The strip forms a seal when it encircles a shaft and is adhered to a surface (e.g., a bearing mount or bearing housing) extending radially outwardly from the shaft. One edge of the strip is adapted to contact and conform to the shaft when the terminal ends overlap.

The seal of this invention can be installed without costly and time-consuming disassembly of the components of the machinery or equipment being repaired. Furthermore, there is no need for drilling holes or using cover plates to hold the seal in place. Moreover, the seal may be applied even in situations where there is very limited space to work in. The installation is not time-consuming or costly and does not require expensive or cumbersome tools or equipment. Also, the novel seal may be provided in any desired configuration, and the seal is adapted to conform to various shaft sizes.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
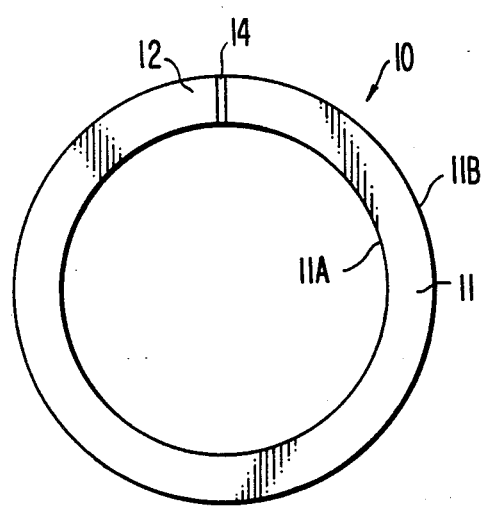
FIG. 1 is a side elevational view of one embodiment of seal of this invention.
Figure 2:
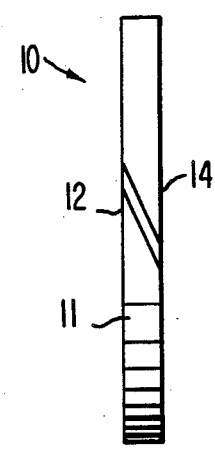
FIG. 2 is a top view of the embodiment of seal shown in FIG. 1.

Thus, in FIGS. 1 and 2 there is shown one embodiment of seal 10 of this invention. The seal comprises an elongated strip 11 having two terminal ends 12 and 14. The strip 11 is flexible and has a length greater than its width.

The strip preferably has sloped or slanted ends 12 and 14 (as shown in FIG. 2) which are adapted to mate when the strip is encircled around a shaft. Thus, the end portions 12 and 14 are adapted to overlap and may slide past one another so that the seal may conform to shafts of different diameters.

The strip 11 generally forms an annular ring, as shown, which is easily opened so that the seal may fit over and around a shaft without disassembly of the machinery or equipment in which the shaft is located.

The strip is typically composed of a synthetic rubber (such as silicone rubber or a fluoroelastomer or any other type of durable, flexible rubber or elastomer). The strip is preferably oil and moisture resistant, weather-resistant and corrosion resistant. The strip should also be crack resistant at temperatures in the range of about −50° F. to 150° F.

The thickness of the strip may vary. Generally speaking the strip should be sufficiently thick to be durable and crack resistant but yet should not be so thick as to be non-flexible or non-conformable. A convenient and suitable thickness is about 0.2–0.4 inch at the thickest part.

The width of the strip (i.e., the distance between the inside 11A and outside 11B of the annular ring shape) may also vary. However, a width of about 0.5–0.8 inch is very suitable for most applications.

Figure 5:
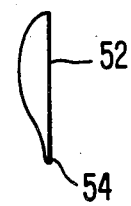
FIG. 5 illustrates one type of cross-sectional configuration for the seal of the invention.

Various different types of cross-sectional configurations for the seal strip may be used. Thus, in FIG. 5 there is illustrated a cross-sectional configuration which may be referred to as a half teardrop shape. One side surface 52 is flat so that it may be readily and easily adhered to a flat surface, such as the flat outer surface of a bearing housing. The tip 54 is shown as having a thinner cross-section than the upper portions of the seal so that the tip can more easily conform to the surface of the shaft around which it will be positioned.

Figure 3:
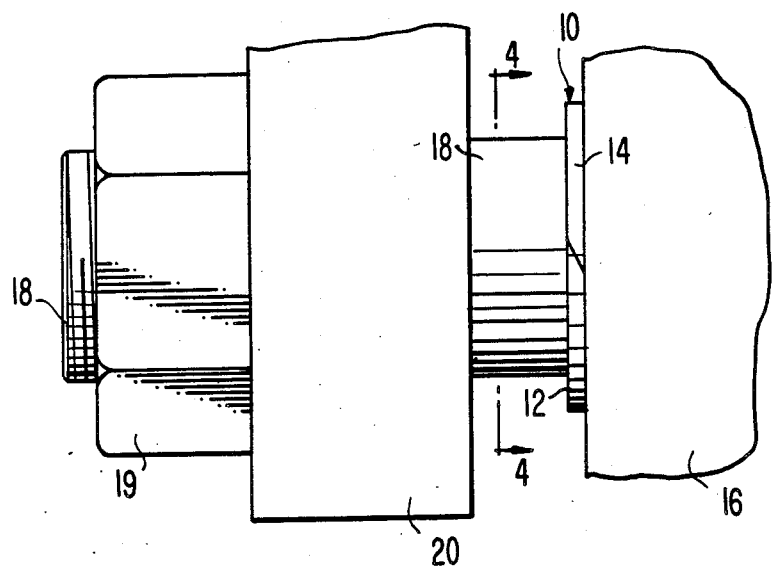
FIG. 3 is a side view showing a seal of this invention installed on a shaft between a bearing housing and a crank arm.
Figure 4:
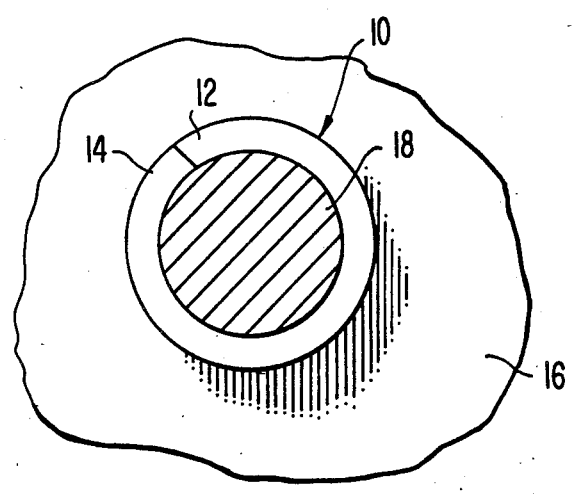
FIG. 4 is an elevational view along line 4—4 in FIG. 3.

Installation of the seal of the invention is illustrated in FIGS. 3 and 4. A bearing housing 16 surrounds rotating shaft 18 which extends outwardly from housing 16. A crank arm 20 is securely fastened to shaft 18. Nut 19 is threaded onto the outer end of shaft 18. A seal 10 of the invention is applied around shaft 18 and is adhered to the face of housing 16. The ends 12 and 14 of the seal 10 are adapted to slide past one another as they overlap so that the lower edge of the seal conforms to the surface of the shaft. The gap between the housing 16 and the crank arm 20 may be less than one inch, for example.

The face of the seal 10 is flat and is adhered to the abutting face of housing 16 (which has been thoroughly cleaned) by means of an adhesive to hold the seal firmly in position. The adhesive which may be used may be a one-part, two-part, or other multi-part curable adhesive. For example, it may even be an anaerobic adhesive or a pressure-sensitive adhesive. It may also comprise two components, one of which is applied to the face of the seal and the other of which is applied to the face of the housing.

When a pressure-sensitive adhesive is used it may be applied to one face of the seal and then covered with a removable protective liner until the time of installation.

The seal strips of this invention may be made in a series of standard sizes which will accommodate shaft sizes within a wide range of diameters. For example, generally annular shaped seals of this invention having a diameter of 3 inches (inside diameter) will accommodate shaft sizes of 1.5–3 inches. A seal having a diameter of 4.5 inches will accommodate shaft sizes of 3–4.5 inches. A seal having a diameter of 6.5 inches will accommodate shaft sizes of 4.5–6.5 inches. A seal having a diameter of 9 inches will accommodate shaft sizes of 6.5–9 inches. Various other sizes may also be made (e.g., by a simple molding process) which will each accommodate a wide range of shaft sizes.

The seals of the invention may be applied to a bearing or seal housing easily and expeditiously without disassembly of the equipment. They may also be used in very narrow spaces.

If desired, the flat surface of the seal which is to be adhered to the bearing or seal housing may be slightly roughened to enhance bonding.

Other variants of the invention are possible without departing from the scope of the present invention.

What is claimed is:

1. A method for providing a seal around a shaft adjacent to the outer surface of a bearing housing extending radially outwardly from said shaft, said method comprising the steps of:
   (a) providing an elongated flexible strip having two terminal ends and a length greater than its width; whererin one side of said strip comprises a flat surface;
   (b) encircling said shaft with said elongated flexible strip;
   (c) adhering said flat surface of said strip to said outer surface of said bearing housing in a manner such that one edge of said strip is in contact with, and conforms to, said shaft, and wherein said terminal ends are in contact with each other.

2. A method in accordance with claim 1, wherein said strip comprises synthetic rubber and wherein one side of said seal comprises a flat surface.

3. A method in accordance with claim 1, wherein said ends of said strip are sloped in opposite directions in a manner such that they mate when said strip encircles said shaft.

* * * * *